Aug. 6, 1940.  C. T. McGILL  2,209,991
MULTIPORT VALVE
Filed Jan. 10, 1938   2 Sheets-Sheet 1

Inventor:
Chester T. McGill
By
McCanna, Wintercorn & Morsbach
Attys.

Aug. 6, 1940.　　　C. T. McGILL　　　2,209,991
MULTIPORT VALVE
Filed Jan. 10, 1938　　　2 Sheets-Sheet 2
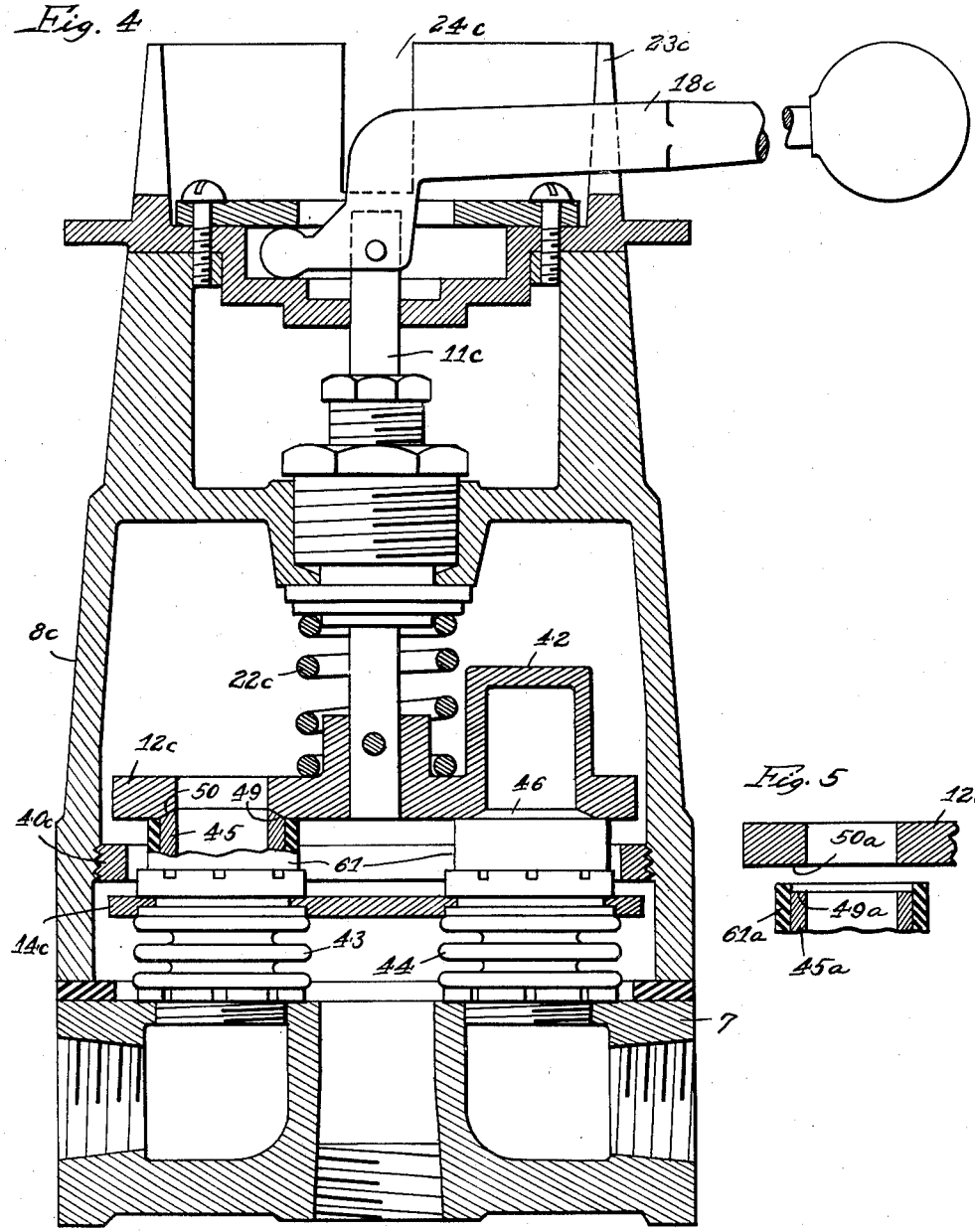
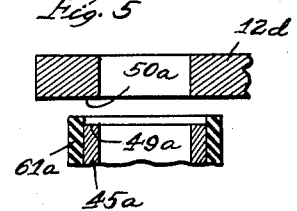
Inventor:
Chester T. McGill
By
McCanna, Wintercorn & Morsbach
Attys.

Patented Aug. 6, 1940

2,209,991

UNITED STATES PATENT OFFICE 2,209,991

MULTIPORT VALVE

Chester T. McGill, Elgin, Ill.

Application January 10, 1938, Serial No. 184,270

30 Claims. (Cl. 251—84)

This invention relates to a new and improved multiport, multiplate type valve.

The principal object of my invention is to provide a multiport valve having expansible and compressible bellows in the various ports serving as the sealing elements between the stator and rotor, these bellows being now commercially obtainable at reasonably low cost and being suited to the requirements of a valve of this kind, wherein the amount of movement of the bellows in seating and unseating is well within the limits specified by the bellows manufacturers.

An important feature of the invention is the provision of a multiported head plate to which all of the bellows are attached at one end, the plate being movable with the bellows in the seating and unseating movements thereof, insuring uniform movement of all of the bellows and uniformly good seating at all of the ports.

Another important feature of the invention is the provision whereby the movable multiported head plate serves also as a shut-off valve to stop the flow of incoming fluid during the shifting of the valve from one position to another.

Another important object of the invention is to provide a valve of the kind herein described which in one form has the head plate arranged to be moved to retracted position to unseat the several bellows simultaneously from the rotor, or stator, as the case may be, prior to the turning of the rotor to another position, and which in another form has the rotor liftable off the bellows to permit turning the same to another position, after which it is adapted to be reseated, the head plate in the latter form being preferably limited in its movement so as to hold all of the bellows in a predetermined plane preparatory to reseating of the rotor. In both forms, the head plate is equally well adapted to serve the purpose of a shut-off valve.

Still another object of the invention is to provide valves of both types mentioned having improved seat rings arranged to have abutment either on a flat surface on the rotor or in tapered seats thereon, with or without compressible sealing rings surrounding the same and arranged to be compressed in the seating movement.

The invention is illustrated in the accompanying drawings, in which—

Fig. 4 is a section similar to Fig. 1, but showing a lift-turn type valve, and

Fig. 5 is a fragmentary sectional detail illustrating a different form of seat ring usable in the constructions of Figs. 1 and 4.

Similar reference numerals are applied to corresponding parts throughout the views.

Figure 1:
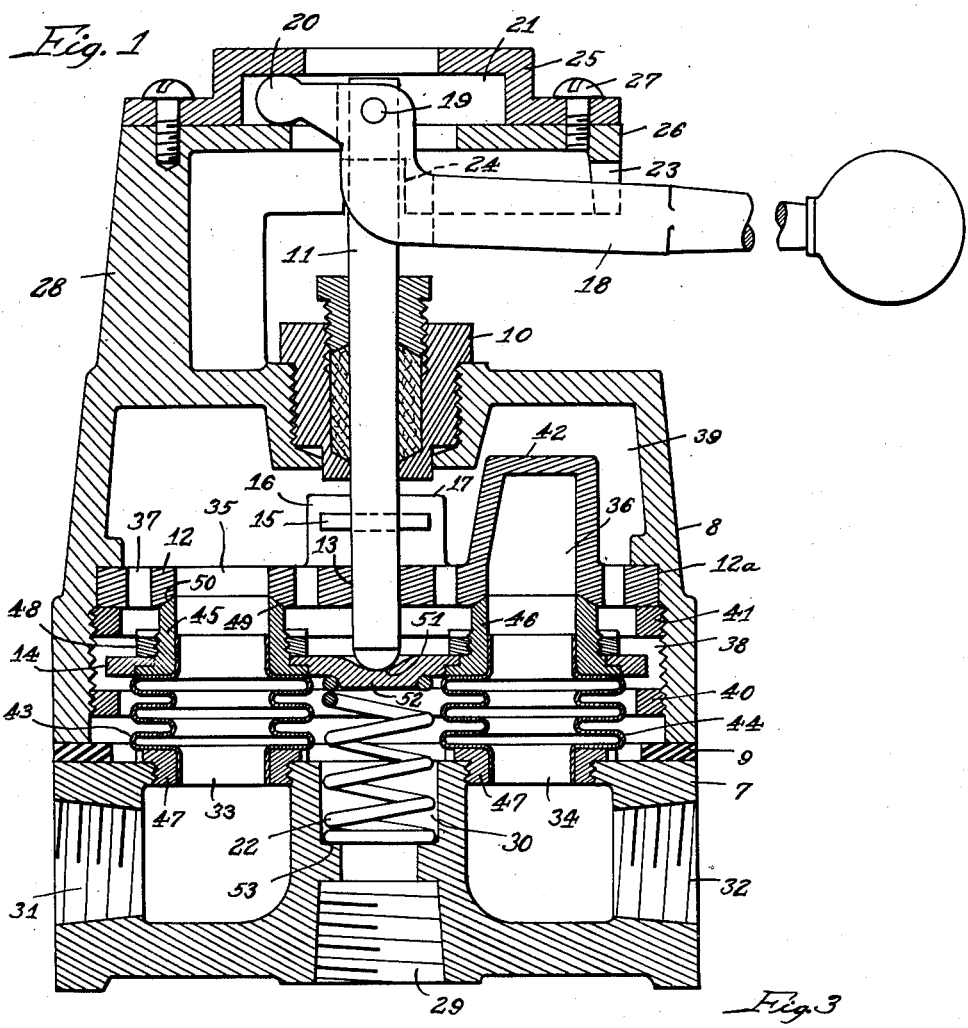
Figure 1 is a central vertical section through a multiport valve made in accordance with my invention.

Referring first to Fig. 1, the numeral 7 designates generally the stator or body member of the valve on which a cap or cover 8 is suitably secured, compressing a gasket 9 therebetween to prevent leakage. A packing gland 10 at the center of the top wall of the cover 8 has the valve stem 11 reciprocable and rotatable therein and serves to prevent leakage. 12 is the rotor and has a center hole 13 through which the stem 11 extends to the head plate 14 to operate the latter, as will soon appear. A cross-pin 15 in the stem 11 above the rotor 12 is slidable up and down in the diametrical slot 16 in the central boss 17 provided on the top of the rotor 12, whereby to permit reciprocation of the stem 11 relative to the rotor 12, but still permit turning the rotor by means of the stem. The hand lever 18 is pivoted to the upper end of the stem 11, as at 19, and has an arm 20 received with a sliding, working fit in the annular guide 21, so that downward movement of the hand lever 18 serves to depress the head plate 14 against the action of the coiled compression spring 22, while at the same time retracting the lever from its retaining notch 23 or 24, as the case may be, so that the lever may be swung sideways in either direction to turn the stem 11 and the rotor 12 with it. In the downward movement of the lever 18, the valve is "unseated," as will soon appear, and when the lever is then turned to bring the same into register with one of the other retaining notches, the rotor 12 is thereby turned to establish a new system of port communication, whereupon the hand lever 18, if permitted to enter the registering notch, causes the valve to be "reseated." It is, of course, understood that the annular guide 21 is provided between the ring 25 and the top of the yoke 26 onto which the ring is fastened, as at 27, and that the yoke 26 extends annularly with respect to the top of the stem 11, with the notches 23 and 24, and such other notches as may be provided, all radially arranged and circumferentially spaced with respect to the stem as a center. The yoke 26 is shown as formed integral with an arm 28 extending upwardly from the top of the cover 8 on one side of the stem 11.

While the present invention is applicable to valves generally, the valve disclosed is designed particularly for use in controlling the flow of fluids to and from a zeolite water softener, and the stator 7 has a central axial threaded opening 29 for connection with the raw water supply pipe. Hence, the port 30 with which this opening communicates may properly be called a pressure port. A plurality of radial threaded openings like those shown at 31 and 32 are provided in the stator in circumferentially spaced relation for connection to pipes that conduct fluid into and out of the valve through the central pressure port 30 and circumferentially spaced ports such as those shown at 33 and 34 in the top of the stator. Now, the rotor 12 has circumferentially spaced ports like those shown at 35 and 36 which come into register with the circumferentially spaced ports in the stator in different operative positions of rotor adjustment of the rotor. There are in addition a series of holes 37 in the rotor permitting passage of fluid freely from the chamber 38 under the rotor to the chamber 39 above the same, so long as the head plate 14 is in elevated relation to a seat ring 40. The latter is threaded in the cover 8 to a point in spaced relation beneath the retaining ring 41 threaded in the cover beneath the rotor 12 and leaving the rotor free to turn in the annular recess 12a provided therefor in the cover. In other words, when the head plate 14 is depressed by means of the hand lever 18, as above described, preliminary to the turning of the rotor 12, it seats on the ring 40 to prevent further flow of fluid into the valve through the port 30 while the valve is being shifted from one position to another. The hollow boss, indicated at 42 on the rotor 12, is merely to provide a connecting passage between the port 36 and another port in the rotor not shown in Fig. 1. This boss therefore provides communication between whatever stator ports are placed in communication with the rotor ports interconnected by said boss. It is clear that the rotor 12 will be turned to positions predetermined by the location of notches, like those shown at 23 and 24, for reception of the hand lever 18 so as to bring rotor ports selectively into registration with stator ports and thereby control the flow of fluid through the valve in a predetermined manner.

A plurality of resilient metallic bellows, such as those shown at 43 and 44 in the stator ports 33 and 34, are connected to the head plate 14 by seat rings like those shown at 45 and 46 communicating with the rotor ports 35 and 36, respectively. Bushings 47 suitably secured to the lower ends of the bellows thread into the stator ports to mount the bellows therein. The upper ends of the bellows are suitably secured in the lower ends of the seat rings 45 which fit in holes in the head plate 14 and are retained by nuts 48 threaded on the seat rings and jamming against the head plate. The ends of the seat rings are tapered, as at 49, to fit the bevelled seats 50 provided around the ports in the rotor, whereby to effect good sealing engagement and minimize leakage. It is believed to be manifest that since the force is applied by the stem 11 to the center of the plate 14 in the recess 51, all of the seat rings have substantially the same pull exerted thereon to unseat the same, and when the stem 11 permits the spring 22 to return the head plate to its normal position, there is substantially uniform pressure applied to all of the seat rings, due to the fact that the spring 22 bears against the plate at the center, around the downwardly projecting circular boss 52. An annular shoulder 53 in the port 30 forms a seat for the other end of the spring 22. Bellows are not compressed sufficiently in the operation of the valve to cause fatigue in the metal thereof, because the seat ring 40 limits the retracting movement of the head plate 14. The movement is, however, ample to withdraw the seat rings 45—46 from the rotor ports so that the rotor 12 may be turned to another position.

Figures 2, 3:
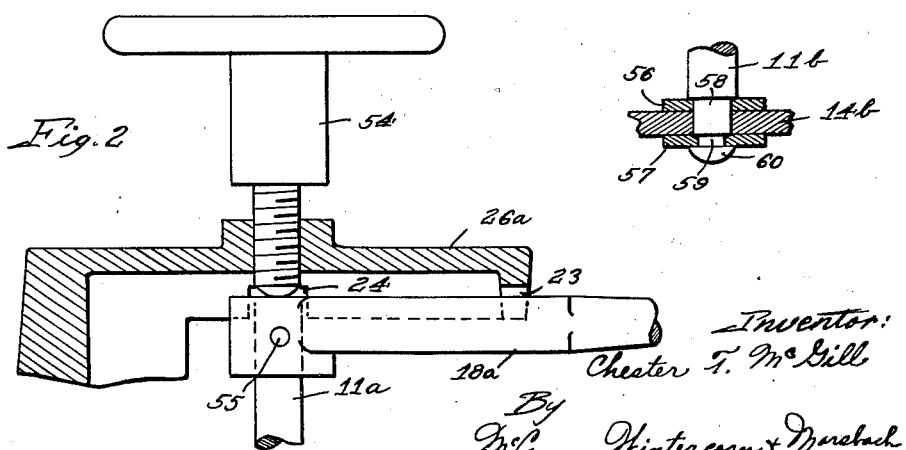
Fig. 2 is a fragmentary sectional detail of a modified construction illustrating how a valve like that of Fig. 1 might utilize a screw for unseating and a lever for turning the same.
Fig. 3 is also a fragmentary sectional detail illustrating how a valve like that of Fig. 1 might be modified so that the hand lever would act not only to unseat but reseat the valve in addition to turning the same from one position to another.

If desired, I may modify the construction of Fig. 1 as shown in Fig. 2, providing a yoke 26a in which a hand screw 54 threads against the upper end of the stem 11a to force the same downwardly to move the head plate 14 to retracted position seating on the seat ring 40, while a hand lever 18a pinned to the stem 11a, as at 55, is used merely for turning the stem so as to turn the rotor 12 to desired positions. The hand lever 18a in this case also serves as a locating and locking means for the rotor by engaging selectively in any one of a plurality of notches in the yoke 26a, as indicated at 23. This construction while slower in operation, affords the advantage of slowing down the reseating of the seat rings 45—46 so as to minimize water hammer. Then, too, it permits seating the head plate 14 tightly on the seat ring 40, and holding it in such position without materially increasing the force required to turn the rotor with the hand lever 18a.

A further modification of Fig. 1 is shown in Fig. 3 where the stem 11b is shown rotatably connected at its lower end with the head plate 14b, so as to permit elimination of the spring 22, the head plate 14b being arranged to be raised and lowered by means of the stem 11b in the operation of the hand lever 18. While any suitable construction may be employed for the swivel connection between the stem and plate, I have shown washers 56 and 57 bearing against the top and bottom of the plate with the reduced portion 58 on the end of the stem fitting in the upper washer, and the further reduced tip portion 59 fitting in the lower washer, the end of the stem being upset, as at 60, to hold the parts together. With this construction, the seat rings 45—46 would be held seated under water pressure active against the plate 14b, which in its seated position has less area exposed to water pressure on the top thereof than on the bottom, by reason of the seat rings 45—46 engaging the seats on the rotor 12.

The valve of Fig. 4 is somewhat similar to that of Fig. 1, but is of a lift-turn type, the rotor 12c being liftable with the stem 11c and rotatable from one position to another by means of the hand lever 18c. A spring 22c inside the cover 8c tends normally to hold the rotor seated on the seat rings 45—46, and when the hand lever 18c is raised to lift the rotor off the seat rings, the head plate 14c attached to the bellows 43—44 rises partly under the normal expansion of the bellows and partly under water pressure and engages a seat ring 40c whereby to shut off water flow through the valve while the rotor is being turned to another position. Thereafter when the rotor 12c is lowered again, the seat rings 45—46 are first engaged by the rotor in the ports brought into register therewith and the head plate 14c is forced downwardly away from the seat ring 40c, and the parts assume the relationship substantially as shown in Fig. 4 where the pressure of the spring 22c is balanced by the expansive force of the bellows 43—44 and water pressure active on the head plate 14c. Compressible rubber seal rings are shown at 61 surrounding the seat rings 45—46, and normally have their upper ends disposed somewhat above the elevation shown in Fig. 4, so that when the rotor seats on the seat rings, these seal rings are subjected to enough compression endwise to engage the bottom surface of the rotor 12c annularly with respect to each of the ports and seat rings engaged therein, to minimize danger of leakage. This is illustrated in Fig. 5 wherein a modification is illustrated and wherein the rubber seal ring 61a projects normally slightly above the plane of the upper end of the seat ring 45a, and will therefore be subjected to compression when the rotor 12d is lowered into engagement with the seat ring. In this modification, the end of the seat ring provides a flat seating surface 49a for engagement with the flat bottom surface 50a on the rotor.

It is believed to be clear that the operation of a valve like that shown in Fig. 4, or modified along the lines of Fig. 5, will operate in substantially the same manner and afford substantially the same advantages as a valve constructed along the lines of Fig. 1, or as modified in Fig. 2 or 3.

It is believed the foregoing description conveys a good understanding of the objects and advantages of my invention. The appended claims are drawn with a view to covering all legitimate modifications and adaptations.

I claim:

1. In a plate type valve, a ported body member, a ported plate member, compressible and expansible bellows supported on one of said members communicating with the ports thereof and projecting toward the other member and having seats on the outer ends thereof adapted to be held in sealed relation to the ports of said other member, said bellows permitting axial movement of the seats relative to the bellows-supporting member, and means for relieving seating pressure of the seats by relative axial movement between the outer ends of said bellows and said other member and moving the other member to different positions while in relieved relation to the seats.

2. In a plate type valve, a ported body member, a ported plate member, seats on the body member registering with the ports thereof and projecting toward and movable with respect to the plate member and adapted to be held in sealed relation to the ports thereof, and means for unseating the seats from the plate member and moving the plate member from one position to another and reseating the seats thereon.

3. In a plate type valve, a ported body member, a ported plate member, compressible and expansible bellows communicating with the ports of one of said members and projecting toward the other member and carrying seats adapted to be held in sealed relation to the ports thereof, and means for relieving seating pressure of the seats by compression of the bellows, moving the plate member from one position to another, and restoring seating pressure of the seats by expansion of the bellows.

4. In a plate type valve, a ported body member, a ported plate member, collapsible and expansible bellows carried on the body member in communication with the ports thereof and projecting toward the plate member, a head plate attached to the free ends of said bellows between the plate and body members, seats extending between the head plate and plate member to establish communication between the bellows and the ports in the plate member, and means for moving the head plate in seating and unseating movements relative to the plate and body members and moving the plate member from one operative position to another while the head plate is in unseated position.

5. A valve as set forth in claim 4, including a valve seat between the plate member and body member arranged to be engaged by the head plate in the unseated position thereof relative to the plate member.

6. In a plate type valve, a ported body member, a ported plate member, collapsible and expansible bellows carried on the body member in communication with the ports thereof and projecting toward the plate member, a head plate attached to the free ends of said bellows between the plate and body members, seats extending between the head plate and plate member to establish communication between the bellows and the ports in the plate member, said bellows maintaining communication between said seats and the ports in the body member while permitting movement of said seats and head plate relative to the body, and means for unseating and moving the plate member from one operative position to another and reseating the same in normal relation to the head plate.

7. A valve as set forth in claim 6, including a valve seat between the head plate and plate member arranged to be engaged by the head plate when the plate member is in unseated relation to the head plate.

8. In a plate type valve, a multiported body member, resilient expansible and compressible bellows attached at one end thereto in communication with the ports thereof, two substantially parallel plates, one being a multiported rotor plate and the other being a head plate attached to the other ends of said bellows, the rotor plate having ports arranged to register with the latter ends of the bellows to be thereby placed in communication with the ports in the body member, said plates being normally resiliently urged toward one another by the spring action of the bellows themselves to maintain sealed relationship between the bellows and the ports in the ported rotor plate, and means for turning the ported rotor plate from one operative position to another.

9. In a plate type valve, a multiported body member, resilient expansible and compressible bellows attached at one end thereto in communication with the ports thereof, two substantially parallel plates, one being a multiported rotor plate and the other being a head plate attached to the other ends of said bellows, the rotor plate having parts arranged to register with the latter ends of the bellows to be thereby placed in communication with the ports in the body member, said plates being normally resiliently urged toward one another by the spring action of the bellows themselves to maintain sealed relationship between the bellows and the ports in the ported rotor plate, and means for exerting pressure on one of said plates axially relative to the other toward unseating and turning the ported rotor plate from one operative position to another.

10. In a plate type valve, a ported body member, resilient expansible and compressible bellows carried thereon in communication with the ports thereof, two substantially parallel plates, one attached to the free ends of said bellows and movable axially toward and away from the body member as permitted by said bellows, and the other having ports therein adapted to register with the free ends of the bellows to be thereby placed in communication with the ports in the body member, said plates being normally urged toward one another to maintain sealed relationship between the bellows and the ports in the ported plate, means for moving one of said plates axially relative to the other to an unseated position and turning the ported plate from one operative position to another, and a stop ring arranged to be engaged by the plate attached to the bellows to hold the same in a substantially parallel relation to the other plate when in unseated relation thereto.

11. The combination in a rotary plate type valve of a stator member carrying a housing and having a plurality of ports, a rotor member in the housing having ports adapted to register with the first mentioned ports in different positions of the rotor, one of the ports in the stator member being a pressure port normally communicating with the rotor member and housing, seats on the stator member communicating with the other ports thereof and projecting toward and movable relative to the rotor member and adapted to be held in sealed relation with the ports therein, and means for unseating the seats and turning the rotor from one operative position to another, said means including a valve for closing off communication between the pressure port and the rotor member.

12. The combination in a rotary plate type valve of a stator member carrying a housing and having a plurality of ports, a rotor member in the housing having ports adapted to register with the first mentioned ports in different positions of the rotor, one of the ports in the stator member being a pressure port normally communicating with the rotor member and housing, seats on the stator member communicating with the other ports thereof and projecting toward and movable relative to the rotor member and adapted to be held in sealed relation with the ports therein, means for unseating, turning, and reseating the rotor member to change communication with the body member, and means movable with the seats in the unseating of the rotor member to close off communication between the pressure port and the rotor member when the rotor member is unseated.

13. In a plate type valve, the combination of a ported body member, two plates in substantially parallel relation over the body member, a cover on the body member enclosing said plates, one of the ports in the body member being a pressure port normally communicating with the inside of the cover, one of the aforesaid plates being a multiported rotor plate, resilient expansible and compressible bellows communicating with the other ports in the body member and attached to the other of said plates for movement of the attached ends thereof axially relative to the body member, the rotor plate having ports therein adapted to communicate through the bellows with the ports in the body member in different positions of rotation of the rotor plate, said plates being normally resiliently urged toward one another by the spring action of the bellows themselves to maintain sealed relationship between the bellows and the ports in the ported rotor plate, means for moving one of said plates axially relative to the other and turning the ported rotor plate from one operative position to another and returning the plates to normal relationship, and means for cutting off discharge from the pressure port into the cover during the turning of the ported rotor plate.

14. In a plate type valve, the combination of a ported body member, two plates in substantially parallel relation over the body member, a cover on the body member enclosing said plates, one of the ports in the body member being a pressure port normally communicating with the inside of the cover, resilient expansible and compressible bellows communicating with the other ports in the body member and attached to one of said plates for movement of the attached ends thereof axially relative to the body member, the other of said plates having ports therein adapted to communicate through the bellows with the ports in the body member in different positions of rotation of the plate, means for moving one of said plates axially relative to the other and turning the ported plate from one operative position to another and returning the plates to normal relationship, and a valve seat in the cover member arranged to be engaged by the plate attached to the bellows when the plates are in unseated relation to one another, whereby to cut off discharge from the pressure port into the cover during turning of the ported plate.

15. In a plate type valve, the combination of a ported body member, a cover on the body member providing an annular bearing therein, a ported plate rotatably mounted in said bearing, another ported plate movable axially toward and away from the first plate between the body member and the first plate, means establishing communication between the ports in the body member and the ports in the second plate and between the ports in the second plate and the ports in the first plate, said means constructed to permit axial movement of the second plate while preventing turning thereof, a stem extending through the cover and slidably but non-rotatably connected with the first plate and adapted to turn with respect to the second plate but transmit axial movement thereto by endwise movement of said stem, and means connected with the stem outside the cover for communicating endwise and rotary movements thereto.

16. A valve as set forth in claim 15, wherein the body member has a pressure port communicating with the inside of the cover and the first plate has one or more openings provided therein in addition to the ports for free passage of fluid therethrough from the pressure port, the valve including a seat beneath the second plate for engagement thereby in the unseated position thereof, whereby to close off communication between the pressure port and the openings in the first plate.

17. A valve as set forth in claim 15, including spring means acting between the second plate and body member normally urging the second plate toward the first plate.

18. In a plate type valve, the combination of a ported body member, a cover thereon, one of the ports in the body member being a pressure port communicating with the inside of the cover, resilient expansible and compressible bellows in the other ports in the body member, a seat ring carried on the free end of each of said bellows, a ported stem plate in the cover, the ports of which are adapted to communicate with the seat rings whereby to establish communication through the bellows with the ports in the body member, the bellows and stem plate being relatively movable for unseating of the seat rings with relation to the ports in the stem plate, means for turning the stem plate from one operative position to another while the seat rings are in unseated relation thereto, and compressible resilient sealing rings surrounding the seat rings and engageable with the stem plate in the seating thereof to seal the seated elements.

19. A valve as forth in claim 18, wherein the ports in the stem plate have tapered seating surfaces surrounding the ports therein and wherein the seat rings have the seating ends thereof correspondingly tapered.

20. In a plate type valve, a ported body member, a relatively rotatable ported plate member, compressible and expansible bellows supported on the body member in communication with the ports thereof and projecting toward the plate member and having seats on the outer ends thereof adapted to be held in sealed relation to the ports of the plate member, said bellows permitting axial movement of the seats relative to the body member, and means for releasing seating pressure of the seats by relative axial movement between the outer ends of the bellows and the plate member and turning the plate member to different positions while in released relation to the seats.

21. In a plate type valve, a ported body member, a relatively rotatable ported plate member, compressible and expansible resilient bellows supported on the body member in communication with the ports thereof and projecting toward the plate member and having seats on the outer ends thereof adapted to be held in sealed relation to the ports of the plate member, said bellows normally holding the seats resiliently engaged with the plate member but permitting axial movement of the seats relative to the body member incident to seating and unseating of the seats, and means for releasing seating pressure of the seats by axial movement of the plate member with respect to the outer ends of said bellows and turning the plate member to different positions while in released relation to said seats.

22. In a plate type valve, a ported body member, a relatively rotatable ported plate member, compressible and expansible bellows supported on the body member in communication with the ports thereof and projecting toward the plate member and having seats on the outer ends thereof adapted to be held in sealed relation to the ports of the plate member, said bellows permitting axial movement of the seats relative to the body member incident to seating and unseating of the seats, and means for unseating the seats by axial movement of the outer ends of the bellows relative to the plate member and turning the plate member to different positions while in spaced relation to said seats.

23. In a plate type valve, the combination of a ported body member, a cover thereon, resilient expansible and compressible bellows having one end communicating with the ports in the body member, seat rings carried on the other ends of each of said bellows, a ported stem plate inside the cover, the ports of which are adapted to communicate with the seat rings to establish communication through the bellows with the body ports, the bellows and stem plate being relatively movable for relieving seating pressure of the seat rings with relation to the ports in the stem plate, means for turning the stem plate from one operative position to another while the seat rings are in released relation thereto, and compressible resilient sealing rings surrounding the seat rings and projecting from the seating faces thereof for compressible engagement with the stem plate.

24. In a plate type valve, the combination of a ported body member, a housing thereon providing an annular bearing therein, a ported plate rotatably mounted in said bearing, an intermediate plate movable axially toward and away from the first plate between the body member and the first plate, said intermediate plate having ports provided therein registering with ports in the body member, tubular sealing means between the body member and intermediate plate establishing communication between the ports thereof, other tubular sealing means between the intermediate plate and the rotary plate establishing communication between ports in the rotary plate registering with ports in the intermediate plate, and means for unseating the intermediate plate, turning the rotary plate from one position to another, and reseating the intermediate plate.

25. In a plate type valve, the combination of a ported body member, a housing thereon providing an annular bearing therein, a ported plate rotatably mounted in said bearing, an intermediate plate movable axially toward and away from the first plate between the body member and the first plate, said intermediate plate having ports provided therein registering with ports in the body member, tubular sealing means between the body member and intermediate plate establishing communication between the ports thereof, other tubular sealing means between the intermediate plate and the rotary plate establishing communication between ports in the rotary plate registering with ports in the intermediate plate, an operating stem reciprocable and rotatable with respect to said housing having a swivel engagement with the intermediate plate and slidable driving connection with the rotary plate to permit unseating the intermediate plate, turning the rotary plate with respect thereto from one position to another, and reseating the intermediate plate, and manually operable means for reciprocating and rotating said stem.

26. In a plate type valve, the combination of a ported body member, a housing thereon providing an annular bearing therein, a ported plate rotatably mounted in said bearing, an intermediate plate movable axially toward and away from the first plate between the body member and the first plate, said intermediate plate having ports provided therein registering with ports in the body member, tubular sealing means between the body member and intermediate plate establishing communication between the ports thereof, other tubular sealing means between the intermediate plate and the rotary plate establishing communication between ports in the rotary plate registering with ports in the intermediate plate, spring means normally tending to seat the intermediate plate on the rotary plate, an operating stem reciprocable and rotatable with respect to said housing having a sliding driving connection with the rotary plate and slidable abutment with the intermediate plate to permit unseating said intermediate plate and turning the rotary plate with respect thereto from one position to another before permitting reseating of the intermediate plate under the action of its spring means, and manually operable means for reciprocating and rotating said stem.

27. In a plate type valve, a ported body member, a ported plate member, a ported intermediate member the ports of which register with the ports in the body member and are adapted to be placed in register with the ports in the plate member in different positions of the latter, flexible tubular sealing means between the body member and intermediate member establishing communication between the registering ports, and means for unseating the intermediate member from the plate member and moving the plate member from one position to another and reseating the intermediate member.

28. In a plate type valve, a ported body member, a ported plate member, and a ported intermediate member adapted to establish communication through the ports thereof between the ports in the plate and body members in different positions of relative adjustment of said plate and body members, flexible tubular sealing means between the intermediate member and one of said plate and body members establishing communication between registering ports thereof, and means for unseating the intermediate member from the other of said plate and body members and changing the relationship between the plate and body members and reseating the intermediate member.

29. In a plate type valve, a ported body member, a ported plate member, a ported intermediate member the ports of which register with the ports in the body member and are adapted to be placed in register with the ports in the plate member in different positions of the latter, flexible tubular sealing means between the body member and intermediate member establishing communication between the registering ports, said tubular sealing means having the tubular members thereof constructed to provide bellows portions intermediate the ends thereof collapsible and expansible axially, and means for unseating the intermediate member from the plate member and moving the plate member from one position to another and reseating the intermediate member.

30. In a plate type valve, a ported body member, a ported plate member, and a ported intermediate member adapted to establish communication through the ports thereof between the ports in the plate and body members in different positions of relative adjustment of said plate and body members, flexible tubular sealing means between the intermediate member and one of said plate and body members establishing communication between registering ports thereof, said tubular sealing means having the tubular members thereof constructed to provide bellows portions intermediate the ends thereof collapsible and expansible axially, and means for unseating the intermediate member from the other of said plate and body members and changing the relationship between the plate and body members and reseating the intermediate member.

CHESTER T. McGILL.

CERTIFICATE OF CORRECTION.

Patent No. 2,209,991. August 6, 1940.

CHESTER T. McGILL.

It is hereby certified that error appears in the printed specification of the above numbered patent requiring correction as follows: Page 3, second column, line 64, claim 9, for the word "parts" read --ports-- page 5, first column, line 13, claim 19, after "as" insert --set--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.